United States Patent [19] [11] 4,422,120

Kobayashi et al. [45] Dec. 20, 1983

[54] COMBINATION STARTER-PROTECTOR DEVICE

[75] Inventors: Takashi Kobayashi; Takashi Shikama, both of Yokaichi; Tomoyuki Yamamoto, Ohmihachiman; Atsuo Yokota, Yokaichi, all of Japan

[73] Assignee: Murata Manufacturing Co., Ltd., Japan

[21] Appl. No.: 310,122

[22] Filed: Oct. 9, 1981

[30] Foreign Application Priority Data

| | | | |
|---|---|---|---|
| Oct. 13, 1980 | [JP] | Japan | 55-146248[U] |
| Oct. 23, 1980 | [JP] | Japan | 55-151864[U] |
| Nov. 4, 1980 | [JP] | Japan | 55-158262[U] |
| Nov. 4, 1980 | [JP] | Japan | 55-158264[U] |

[51] Int. Cl.$^3$ .......... H02H 7/08

[52] U.S. Cl. .......... 361/24; 361/27; 361/29; 361/32; 318/783; 318/788; 318/792

[58] Field of Search .......... 361/24, 25, 26–29, 361/31, 32, 106, 165; 318/783, 784, 785, 788, 792

[56] References Cited

U.S. PATENT DOCUMENTS

| | | | |
|---|---|---|---|
| 4,042,860 | 8/1977 | Woods et al. | 361/25 |
| 4,084,202 | 4/1978 | Stoll | 361/29 X |
| 4,092,573 | 5/1978 | D'Entremont | 361/26 X |
| 4,237,510 | 12/1980 | Thompson, Jr. et al. | 361/29 X |

*Primary Examiner*—Patrick R. Salce

*Attorney, Agent, or Firm*—Ostrolenk, Faber, Gerb & Soffen

[57] ABSTRACT

A combination starter-protector device for a winding circuit of a dynamoelectric motor comprises a housing structure having a perforated wall dividing the interior of the housing structure into starter and protector compartments. The starter compartment accommodates therein a positive temperature coefficient thermistor while the protector compartment accommodates therein a bimetal switch. The housing structure has two sets of terminals, one set of the terminals being adapted to be connected to the winding circuit of the motor whereas the other set of the terminals are adapted to be connected to a power source. The distance between the thermistor and the bimetal switch may be adjustable by the employment of a spacer element.

9 Claims, 18 Drawing Figures

COMBINATION STARTER-PROTECTOR DEVICE

BACKGROUND OF THE INVENTION

The present invention generally relates to a combination starter-protector device for starting a dynamoelectric motor and also for protecting the windings thereof in the event of the occurrence of a current overload condition and, more particularly, to the combination starter-protector device of a type utilizing a positive temperature coefficient (PTC) thermistor, which device is adapted to be directly mounted to the dynamoelectric motor.

In existing single phase induction motors, such as condensor start induction motors and split phase type motors, a PTC thermistor has come to be used as a switching element for energizing the start winding of the motor and disassociating the start winding from the run or main windings of the motor when the motor attains its running speed. A typical combination starter-protector device now commercially utilized will now be described with particular referrence to FIG. 1 of the accompanying drawings.

As shown in FIG. 1, the single phase induction motor Mo of split phase type has three terminals 1, 2 and 3 and includes a run or main winding Lo connected between the terminals 1 and 2 and a start winding $L_1$ connected between the terminals 1 and 3. The terminal 1 is adapted to be in turn connected to a source G of A.C. current through an overload relay 6 comprised of a heater 5 and a bimetallic thermostat 4, whereas the terminal 2 is adapted to be connected to the A.C. current source G through an on-off main switch SW. A PTC thermistor 7 is connected between the terminal 3 and the switch SW such that, when the switch SW is turned on, the PTC thermistor 7 is heated by the current flowing therethrough accompanied by a corresponding increase of the resistance thereof in response to the flow of such current. At the time when or after the resistance of the PTC thermistor 7 has attained a predetermined value great enough to permit the start winding $L_1$ to effect a higher starting torque of the motor Mo during the start-up period thereof, the PTC thermistor 7 is disassociated from circuit relation with the run winding Lo, that is, substantially disconnected from the power source G, thereby minimizing a loss of electrical power which would otherwise be consumed by the start winding $L_1$.

In the case of a conventional hermetic motor system, such as shown in FIG. 2 of the accompanying drawings, utilizing the single phase induction motor Mo of split phase type and utilizing the starter circuit shown in FIG. 1, the compressor motor is hermetically sealed within a compressor jacket or housing 8. In this system, the starter device 9 utilizing the PTC thermistor 7 is mounted on a chassis 10 of a housing 10*a* separate from the compressor jacket 8 whereas the motor terminals (glass terminals) 1, 2 and 3 are rigidly carried by the compressor jacket 8.

However, where the starter-protector device 9 is installed separately from the compressor jacket 8 in the manner as shown in FIG. 2, the following disadvantages and inconveniences have been found:

(1) A space for installation of the device 9 as well as a device housing 10*a* are required.

(2) A wiring is required between the device 9 and the motor terminals 1 to 3 and, therefore, a cumbersome and time-consuming work is required.

(3) In order for the device 9 to be substituted for the existing starter-protector device in which an electromagnetic relay assembly is utilized, the device 9 must be directly mounted to the compressor jacket 8.

(4) Since the PTC thermistor 7 in the device 9 constantly generates heat energies of a predetermined temperature, the heat energies tend to be dissipated to the outside through terminal elements 9*a* and 9*b* electrically connected to and supporting the PTC thermistor 7. This is particularly true where the terminal elements 9*a* and 9*b*, each partly exposed to the outside of the device housing 10*a* for external electrical connection, are made of copper alloy. The result is that the device 9 tends to consume a relatively large amount of the electrical power.

In addition to these disadvantages and inconveniences described above, there has been found such additional disadvantages that, since the overload relay 6 and the device 9 are spaced a distance from each other without being thermally coupled, the recovery time of the PTC thermistor is prolonged, and that, since the recovery time of the overload relay 6 is of a small value, the recovery time can not be balanced.

Examples of the prior art combination starter-protector device discussed above are disclosed in, for example. U.S. Pat. Nos. 4,037,316, patented July 26, 1977, and 4,042,860 patented Aug. 16, 1977.

BRIEF DESCRIPTION OF THE INVENTION

Accordingly, the present invention has been developed with a view to substantially eliminating the above described disadvantages and inconveniences inherent in the prior art combination starter-protector devices and has for one of its essential object to provide an improved combination starter-protector device of a type compact in size and easy to be directly mounted to the motor, which device comprises a starter housing, accommodating therein the PTC thermistor, and a protector housing accommodating therein the overload relay, both of said housings being coupled to each other in such a manner as to permit heat energies generated from the thermistor to be effectively and efficiently transmitted to the overload relay, whereby the cooling time of the overload relay is delayed to enable the recovery time of the overload relay to become larger than the recovery time of the thermistor thereby to effect a ready re-start of the motor.

Another essential object of the present invention is to provide an improved combination starter-protector device of the type referred to above, wherein the space or distance between the thermistor in the starter housing and the overload relay in the protector housing is so adjustable as to enable the thermal coupling therebetween to be adjustable, whereby variations in the recovery times of the respective overload relay and thermistor can be advantageously compensated for.

A further essential object of the present invention is to provide an improved combination starter-protector device of the type referred to above, wherein the starter and protector housings are communicated to each other through a plurality of perforations defined in one terminal element for the thermistor, thereby avoiding any possible entry of fragments of the thermistor into the protector housing in the event of the occurrence of breakage of the thermistor and also avoiding any possible electrical shortcircuiting which would result from the entry of the fragments into the protector housing.

BRIEF DESCRIPTION OF THE DRAWINGS

These and other objects and features of the present invention will become readily understood from the following description taken in conjunction with preferred embodiments thereof with reference to the accompanying drawings, in which.

DETAILED DESCRIPTION OF THE PREFERRED EMBODIMENTS

Figure 1:
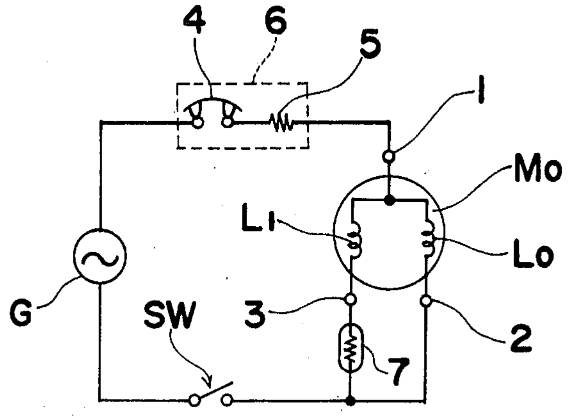
Fig. 1 Prior Art
FIG. 1 is a schematic diagram of an electrical circuit for a dynamoelectric motor showing the prior art combination starter-protector device.

Before the description of the present invention proceeds, it is to be noted that like parts are designated by like reference numerals throughout the accompanying drawings.

Referring now to FIGS. 3 to 7, the combination starter-protector device according to the present invention comprises a stater unit 21 and a protector unit 23. The starter unit 21 is comprised of a starter housing 22, a PTC thermistor 25, a positioning ring 26 of electrically insulating material for positioning the thermistor 25, a terminal member 27 having a plurality of fixed contacts 37 formed thereon, an elastically yieldable terminal member 28 which may be in the form of a leaf spring, and a plug receptacle 29. The starter housing 22 is made of a heat-resistant synthetic resin and is molded in a generally box-like configuration together with a plurality of abutment walls 30, 31, 32 and 33 for the support of the positioning ring 26 in spaced relation to the bottom of the starter housing 22, said abutment walls 30, 31, 32 and 33 surrounding a thermistor chamber 34 defined within the starter housing 22. At least one perforation 35 is defined in the bottom of the starter housing 22 in register with the thermistor chamber 34 so that heat energies generated from the thermistor 25 in a manner as will be described can be transmitted effectively and efficiently from the thermistor chamber 34 to a housing 24 for the protector unit 23.

The thermistor 25 used in the present invention may be of any known construction and is, so far illustrated, in the form of a disc having its opposite surfaces formed with electrode layers (not shown). This thermistor 25 is supported in the opening of the positioning ring 26 by means of a four-point support system including four protuberances 36 which protrude radially inwardly from the positioning ring 26 and contact the peripheral face of the thermistor 25. It is to be noted that the positioning ring 26 having the protuberances 36 is preferably made of mica. The thermistor 25 having the positioning ring 25 positioned therearound in the manner described above is sandwiched between the terminal members 27 and 28, the assembly of said thermistor 25 with the terminal members 27 and 28 on respective sides thereof being accommodated within the thermistor chamber 34 with the positioning ring 26 resting on the abutment walls 30 to 33.

The terminal member 27 with the contacts 37 defined thereon is preferably made of a stainless steel strip prepared by the use of any known metal cutting technique, for example, by means of a press work and has a tab-on terminal 38 of a width smaller than the width of the terminal member 27, which tab-on terminal 38 is formed integrally with said terminal member 27 by bending a substantially intermediate portion thereof. Preferably, the tab-on terminal 38 is of a dimension indentified by #187 or #250 type.

Figure 2:
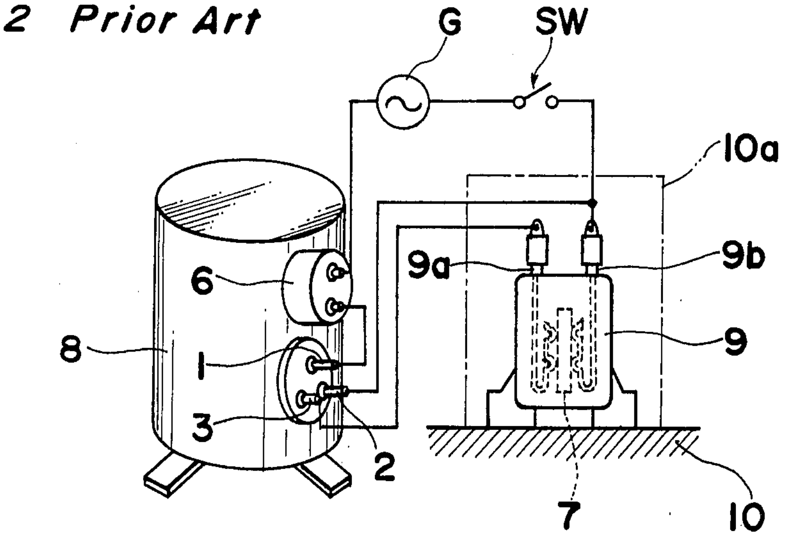
Fig. 2 Prior Art
FIG. 2 is a schematic diagram showing the manner in which the prior art combination starter-protector device is coupled to the dynamoelectric motor.

The elastically yieldable terminal member 28 is preferably made of a stainless steel strip bent at four locations at an angle larger than 90° and has, as is the case with the terminal member 27, one end portion reduced in width, a substantially intermediate portion of said reduced width end portion being bent at 39 perpendicularly to provide a connecting tag to which one end of a support piece 41 is spot-welded. The other end of the support piece 41 remote from the bent end 39 of the terminal member 28 has a socket terminal 40 rigidly connected thereto or otherwise integrally formed therewith, said socket terminal 40 being adapted to receive the glass terminal pin 3 (FIG. 2) on the compressor motor jacket 8. Also spot-welded to the bent end 39 of the terminal member 28 is a similar tab-on terminal 42 connected thereto through the one end of the support piece 41. It is to be noted that the support piece 41 for the socket terminal 40 extends approximately at right angles to the longitudinal axis of the terminal member 28.

Figure 3:
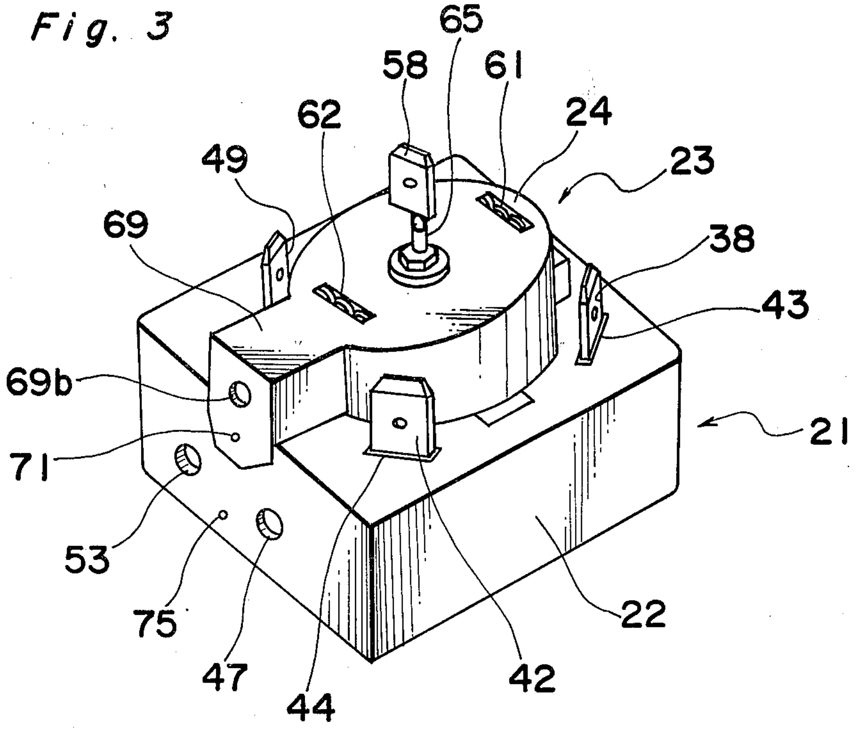
FIG. 3 is a perspective view of a combination starter-protector device according to a first preferred embodiment of the present invention.
Figure 5:
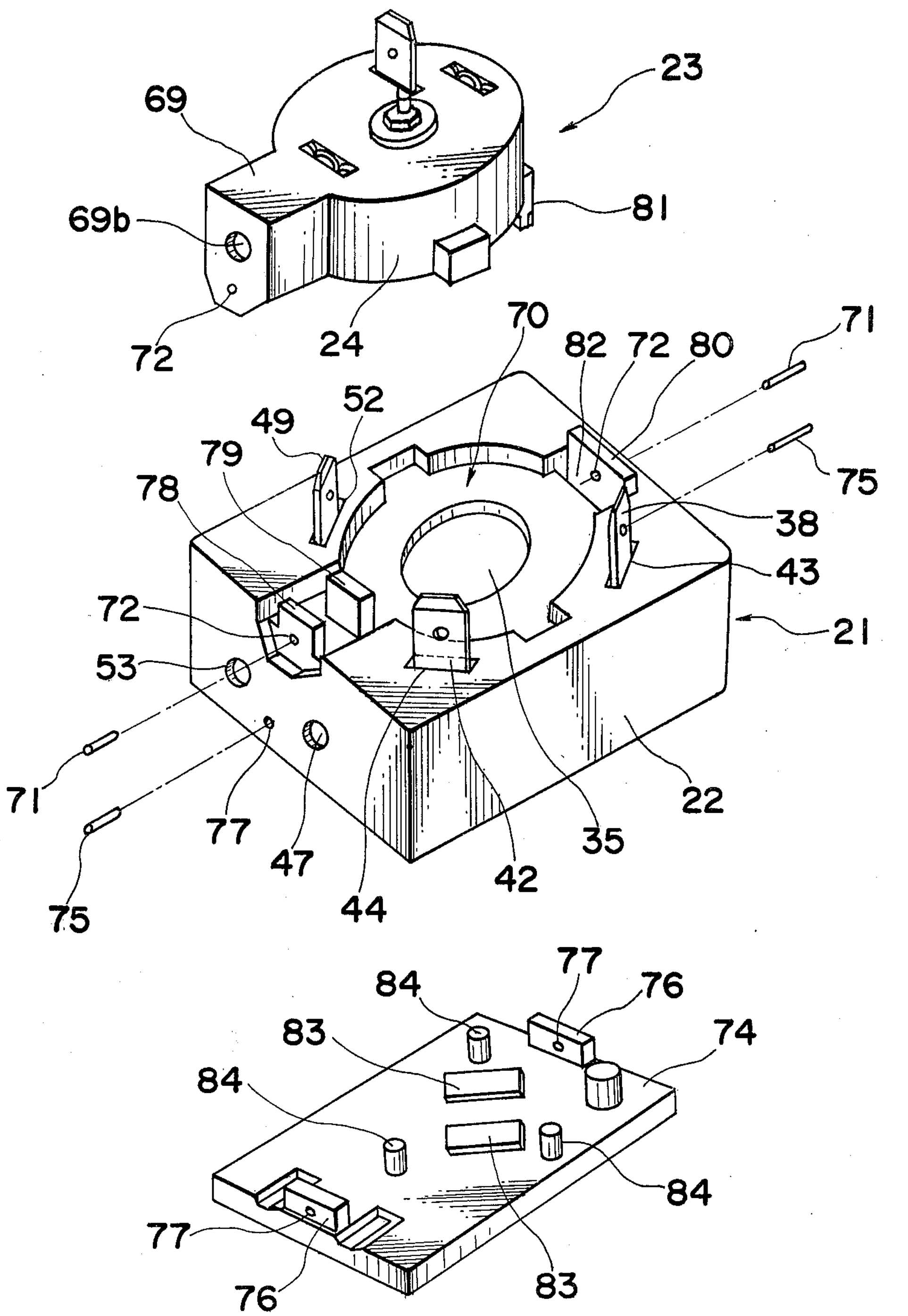
FIG. 5 is an exploded view of the device shown in FIG. 3.
Figure 6:
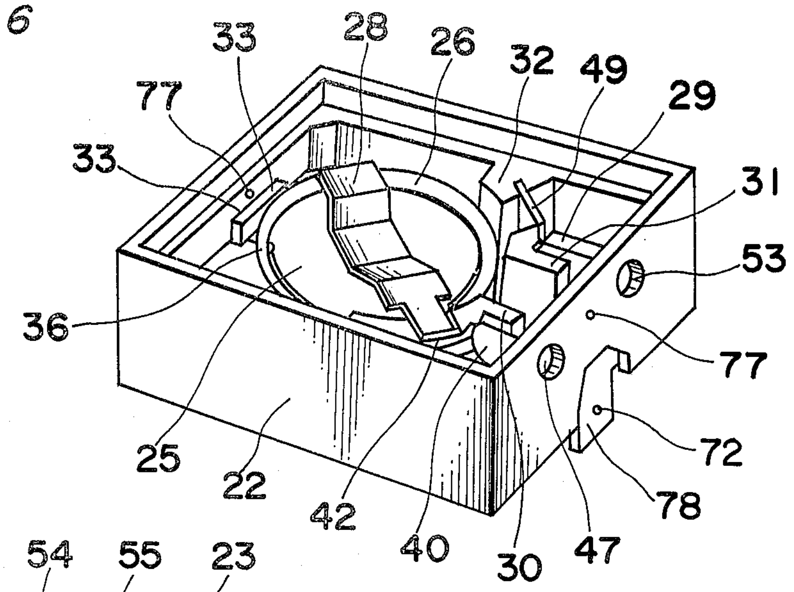
FIG. 6 is a perspective view showing a starter unit used in the device of FIG. 3.

In the assembled condition of the starter unit 21, as best shown in FIG. 6, with the assembly of the thermistor 25 and the terminal members 27 and 28 being accommodated within the thermistor chamber 34, the terminal members 27 and 28 are so positioned that, as best shown in FIG. 5, the respective tab-on terminals 38 and 42 extends to the outside of the starter housing 22 through associated slits 43 and 44 both defined in the bottom of the starter housing 22. At this time, the socket terminal 40 carried by the terminal member 28 through the support piece 41 is aligned with a hole 47 defined in a side wall of the starter housing 22 as shown in FIG. 3 while the support piece 41 is seated in a fitting recess 46 defined in the abutment wall 30.

Again referring to FIG. 7, another socket terminal 29, similar in shape to the socket terminal 40, is rigidly connected to a tab-on terminal 49 through a support piece 48 with the longitudinal axis of said tab-on terminal 49 lying at right angles to the longitudinal axis of the socket terminal 29, said tab-on terminal 49 being spot-welded to the support piece 48. In the assembled condition of the starter unit 21, the socket terminal 29 and the tab-on terminal 49 are positioned in the starter housing 22 in such a manner that the socket terminal 29 is aligned with a hole 53, defined in the side wall of the housing 22 not far from the hole 47 and the tab-on terminal 49 is exposed to the outside of the housing 22 through a slit 52 (FIG. 5) while the opposite lateral sides of said terminal 49 are received in between support grooves 50 and 51 defined respectively in the abutment walls 32 and 31.

The starter unit 21 of the construction described hereinbefore has mounted thereon the protector unit 23 of a construction which will now be described with particular reference to FIGS. 3 to 5.

The protector unit 23 is comprised of a protector housing 24 made of a heat-resistant synthetic resin as is the case with the starter housing 22, said housing 24 having a relay chamber 57 for the accommodation of an overload relay 56 which is constituted by a bimetallic element 54 and a heating element 55 for heating the bimetallic element 54.

A flat wall of the protector housing 24 generally parallel to the starter housing 22 has a #187 or #250 type tab-on terminal 58 and a pair of generally L-shaped contact elements 61 and 62 all rigidly carried thereby, respective internal ends of the contact elements 61 and 62 facing the relay chamber 57 serving as fixed contacts 59 and 60. The heating element 55 of the overload relay 56 has its opposite ends connected to the tab-on terminal 58 and the contact element 61 and is held in position with said opposite ends thereof supported by the respective terminal 58 and element 61.

The heating element 55 housed within the relay chamber 57 is curved to assume a generally ring-shaped configuration and is used to effectively and efficiently heat the bimetallic element 54 positioned therebeneath.

The bimetallic element 55 has its opposite ends formed with respective contact pieces 63 and 64, an intermediate portion of said bimetallic element 55 being rotatably mounted on an adjustment screw member 65 for adjusting the working temperature in a manner as will be described later. The adjustment screw member 65 is threaded through a central portion of the flat wall of the protector housing 24 with its external thread engaged to an internal thread 66 defined in the protector housing 24, whereby by turning the adjustment screw member 65 in either direction about the longitudinal axis thereof, the curvature of the bimetallic element 54 can be adjusted to adjust the predetermined working temperature of the bimetallic element 54.

Figure 7:
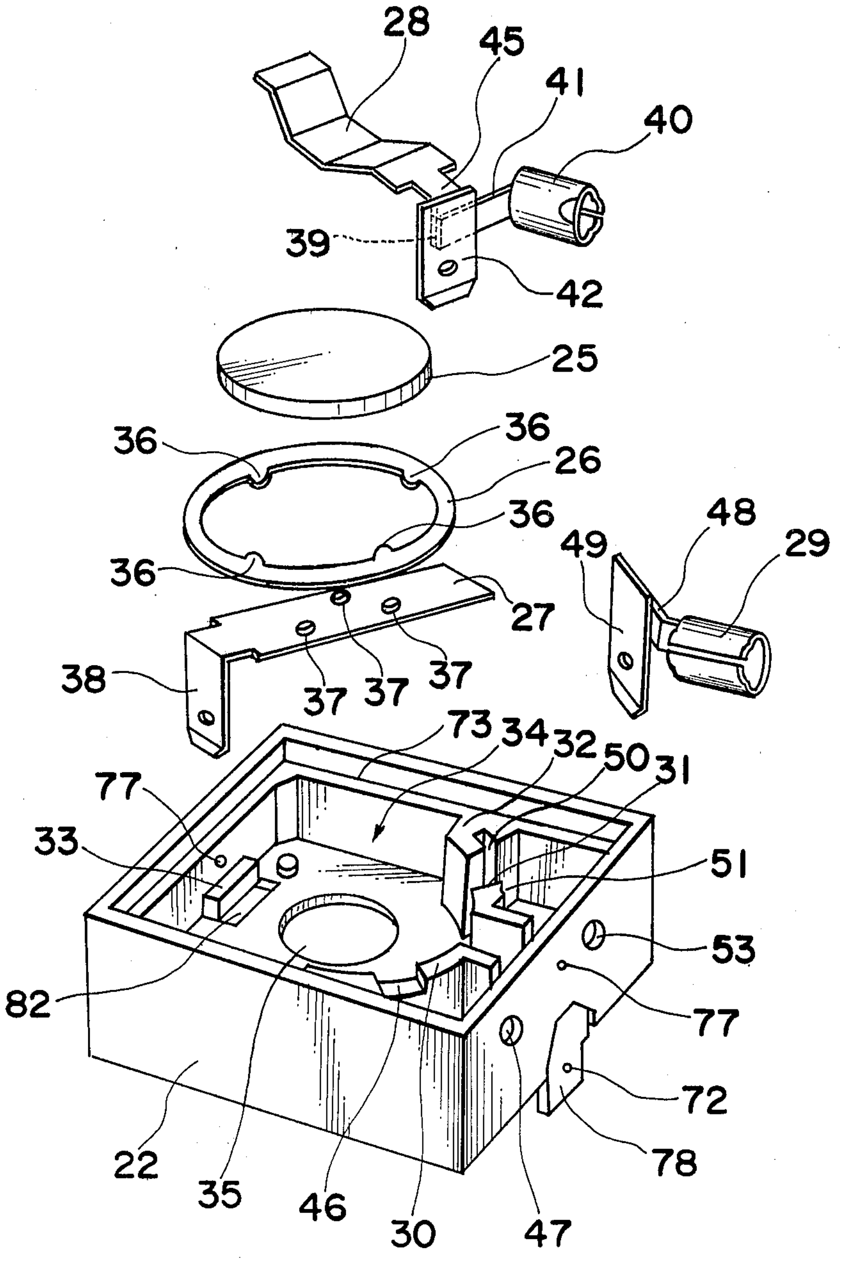
FIG. 7 is an exploded view of the starter unit shown in FIG. 6.
Figure 9:
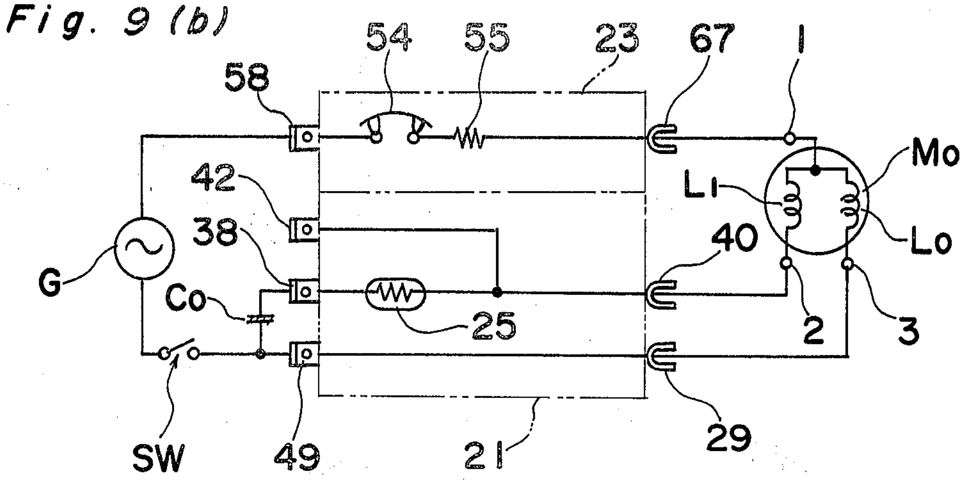
Figure 9:
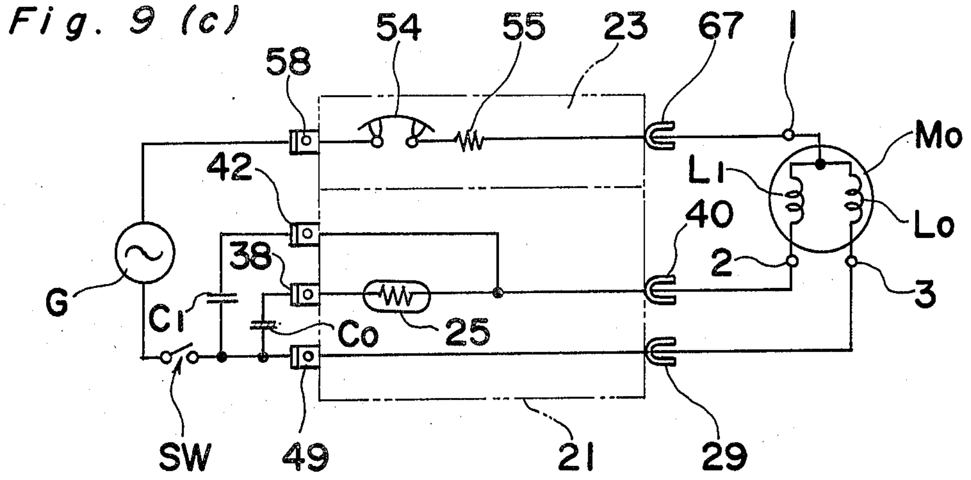
Figure 9:
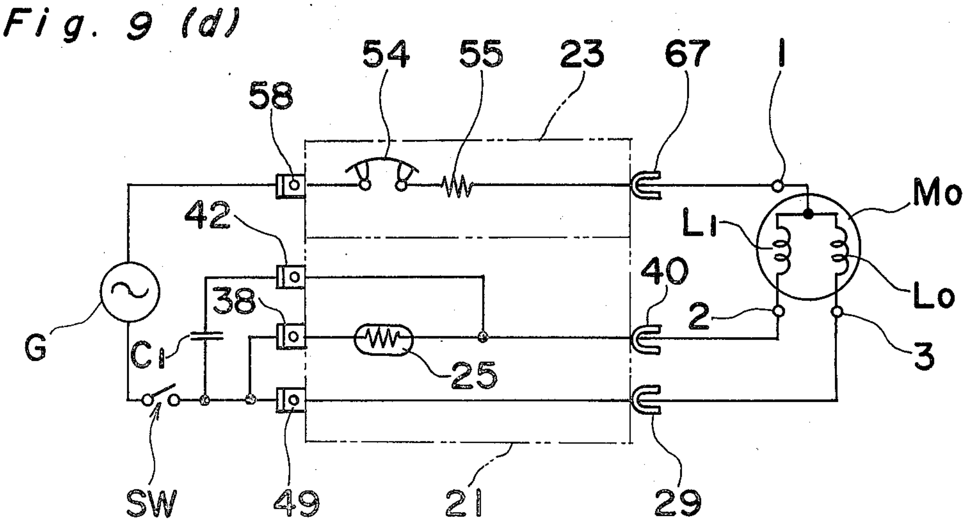

To the contact element 62 is spot-welded a support piece 68 which is rigidly connected to, or otherwise formed integrally with a socket terminal 67 similar to the socket terminal shown in FIG. 7. While the housing 24 is generally of a circular configuration, it has a radially outwardly extending housing projection 69 in which a support groove 69*a* is defined for the support of the socket terminal 67. The socket terminal 67 so supported by and so seated in the support groove 69*a* in the housing projection 69 is aligned with a hole 69*b* defined in the radially outermost end wall of the housing projection 69, which hole 69*b* is, when the protector unit 23 is mounted on the starter unit 21 in the mamnner as shown in FIGS. 3 and 4, positioned in the same plane as the holes 47 and 53 in the starter housing 22.

The protector unit 23 of the construction described hereinabove is, as best shown in FIG. 5, seated in a mating recess 70 defined on the outer surface of the starter housing 22 in a configuration similar to the outer contour of the housing 24 including the housing projection 69 with the opening of the housing 23 facing towards the starter housing 22 and is fixed in position by means of a plurality of set pins 71 passed through fixing holes 72 some defined in the starter housing 22 and the other defined in the protector housing 24.

The opening of the starter housing 22 of the starter unit 21 is closed by a generally rectangular closure plate 74 with its peripheral edge engaged to steps defined at 73 in the inner surfaces of the respective side walls of the starter housing 22. The closure plate 74 is fixed in position to close the opening of the starter housing 22 by means of a plurality of set pins 75 passed through holes 77 in a pair of the opposide side walls of the starter housing 22 and then engaged in respective holes 77 in associated projections 76 fast with the closure plate 74.

Spaced projections defined at 78 and 79 in the starter housing 22 as shown in FIG. 5 serve to support the socket terminal 67 from below to permit the latter to be aligned exactly with the hole 69*b* in the housing projection 69 whereas a projection defined at 80 in the starter housing 22 in opposite relation to the spaced projections 78 and 79 is adapted to be connected by the corresponding set pin 71 with a mating projection 81 integral with the protector housing 24, which mating projection 81 is perforated at 82 for receiving the corresponding pin 71 which has been passed through the hole 72 in the projection 80 fast with the starter housing 22.

As shown in FIG. 5, the closure plate 74 has a plurality of projections 83 and 84 all rigidly mounted on, or otherwise integrally formed with, one surface of the plate 74 facing the interior of the starter housing 22. The projections 83, when the closure plate 74 is held in position to close the opening of the starter housing 22, serve to urge the elastically yieldable terminal member 28 to contact the thermistor 25 whereas the column-shaped projections 84 serve as alignment pins for positioning the closure plate 74 relative to the starter housing 22.

Figure 8:
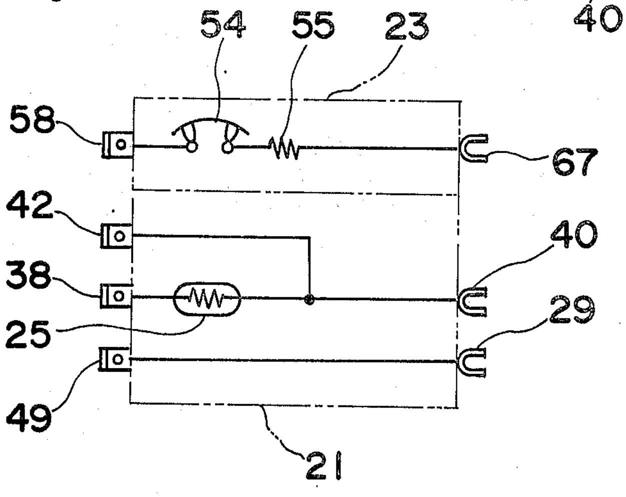
FIG. 8 is a diagram showing an electrical equivalent circuit of the device shown in FIG. 3.

An electrical equivalent circuit of the combination starter-protector device constructed in the manner as hereinbefore described with reference to FIGS. 3 to 7 can be depicted as shown in FIG. 8. As shown in FIG. 8, the bimetallic element 54 and the heating element 55 both constituting respective parts of the overload relay 56 are connected in series with each other between the socket terminal 67 and the tab-on terminal 58, while the thermistor 25 is connected between the terminal members 27 and 28 which are in turn connected respectively to the tab-on terminal 38 and the socket terminal 40. The terminal member 28 is also connected to the tab-on terminal 42 and the socket terminal 29 is connected directly to the tab-on terminal 49.

In the construction described hereinbefore, the thermistor chamber 34 and the relay chamber 57 communicate with each other through the perforation 35. Additionally the socket terminals 29, 40 and 67 are positioned on the same plane on one side of the combination starter-protector device while the tab-on terminals 38, 42, 49 and 58 are positioned on the same plane which is different from the plane in which the socket terminals 29, 40 and 67 are located.

Accordingly, when the combination starter-protector device according to the present invention is mounted to the compressor motor jacket 8 (FIG. 2) with its socket terminals 67, 29 and 40 receiving therein the terminal pins 1, 2 and 3, the thermistor 25 and the overload relay can be electrically connected to the motor circuit of the compressor motor inside the jacket 8. On the other hand, the tab-on terminals 38, 42, 49 and 58 are adpated to be connected to the A.C. power source G in any desired or suitable manner, as will be described with reference to FIGS. 9(*a*) to 9(*d*), depending upon how the motor should be electrically energized.

Figure 9:
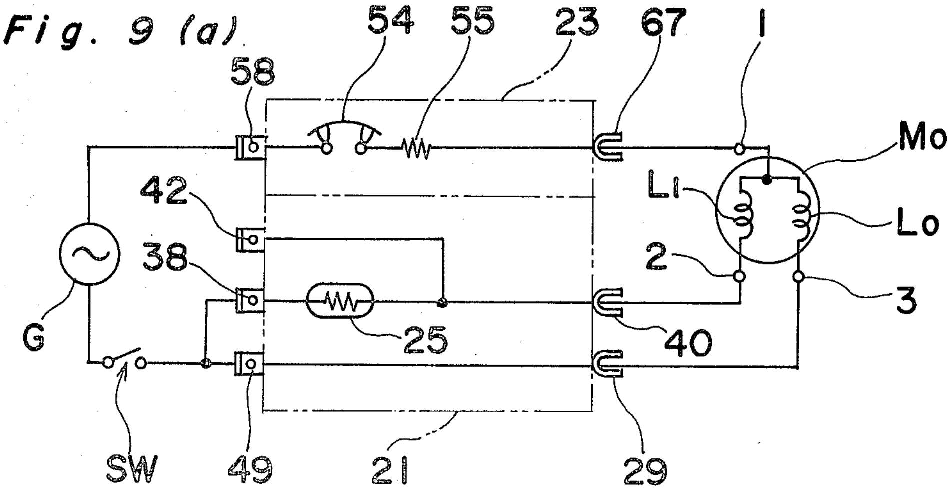
FIGS. 9(*a*) to 9(*d*) illustrate different methods for electrically connecting the combination starter-protector device according to the present invention to the motor and a source of electrical power.

In the case where the dynamoelectric motor Mo with which the combination starter-protector device of the present invention works is desired to be started as a resistance start induction run (RSIR) motor, the tab-on terminals 49 and 58 are connected to the power source G while the tab-on terminals 38 and 49 are connected to each other as shown in FIG. 9(*a*).

In the case where the dynamoelectruc motor Mo is desired to be started as a capacitor start induction run (CSIR) motor, the tab-on terminal 38 is connected to the tab-on terminal 49 through a capacitor Co while the tab-on terminals 49 and 58 are connected to the power source G, as shown in FIG. 9(*b*).

In the case where the compressor motor inside the jacket 8 is constituted by a capacitor start and run (CSR) motor, the circuit shown in FIG. 9(*b*) requires the additional employment of a phase advance capacitor $C_1$ to be connected between the tap-on terminals 42 and 49 as shown in FIG. 9(*c*). In the case where the compressor motor inside the jacket 8 is constituted by a permanent split capacitor (PSC) motor, the capacitor Co employed in the circuit shown in FIG. 9(*c*) is eliminated and the tab-on terminals 38 and 49 are connected to each other, as shown in FIG. 9(*d*).

Hereinafter, the characteristic operation of the combination starter-protector device of the present invention will be described in connection with the circuit shown in FIG. 9(*a*).

Assuming that the main switch SW is closed, and so long as the temperature of the thermistor 25 is low, a current from the power source G is supplied to the start winding $L_1$ of the motor Mo through the thermistor 25 to start the motor Mo. At this time, the heating element 55 in the overload relay 56 is electrically energized, thereby heating the bimetallic element 54, it being, however, to be noted that the bimetallic element 54 is so selected as to remain in the circuit completing position even though heated by cumulative heats from both the heating element 55 and the thermistor 25 during normal operating condition of the combination starter-protector device, but to assume the circuit interrupting position in the event of the occurrence of the current overload condition because the amount of the cumulative heat energies from both the heating element 55 and the thermistor 25 during the current overload condition is much larger than that during the normal operative condition of the device.

Subsequent to the start of the motor Mo, the thermistor 25 is self-heated by the current flowing therethrough, the temperature of which is a function of the resistance of the thermistor 25 to the current flow. As the resistance of the thermistor 25 attains a value equal to or higher than a predetermined value with the increased temperature attaining a value equal to or higher than the Curie point, the current flowing through the start winding $L_1$ of the motor Mo decreases to a negligible value thereby to allow the motor Mo to undergo a constant, normal drive by the current flowing through the run winding Lo thereof, as is well known to those skilled in the art.

During the start-up and running of the motor Mo, the thermistor 25 generates the heat energies which are radiated or directed towards the bimetallic elements 54 through the perforation 35. With the heat energies are introduced from the thermistor 25 into the relay chamber 57, the bimetallic element 54 is heated by radiation and convection of such heat energies as well as heat energies transmitted through the housing 22, it being, however, to be noted that the bimetallic element 54 will not assume the circuit interrupting position unless the current overload condition occurs.

In the event of the occurrence of the current overload condition in the motor Mo, the overload current flows through the heating element 55 to dissipate a relatively large amount of heat energies with which the housings 22 and 24 are in turn excessively heated to further heat the bimetallic element 54, resulting in that the bimetallic element 54 comes to assume the circuit interrupting position with the contacts 63 and 64 disengaged from the contacts 60 and 59. In this way, the supply of the electrical power to the motor Mo is interrupted to protect the latter from the overload condition. Thereafter, that is, subsequent to the interruption of the supply of the electrical power to the motor Mo, both the thermistor 25 and the bimetallic element 54 are cooled by the ambient temperature.

It is to be noted that, since the thermistor chamber 34 is communicated to the relay chamber 57 through the sufficiently large and effectively designed aperture 35 defined in the starter housing 21, and since the bimetallic element 54 and the thermistor 25 are arranged one above the other, the thermistor 25 and the bimetallic element 54 are cooled substantially at the same rate.

In this construction, if the time required for the bimetallic element 54 in the circuit interrupting position to assume the circuit completing position is selected to be larger than the time required for the thermistor 25 of increased resistance to attain a low resistance sufficient to allow the passage of the current therethrough to the start winding $L_1$ of the motor Mo, the recovery time $T_1$ of the bimetallic element 54 becomes larger than the recovery time To of the thermistor 25, namely, $To < T_1$. Accordingly, in such case, the thermistor 25 can be brought in a condition ready to pass the current therethrough to the start winding $L_1$ simultaneously with the return of the bimetallic element 54 from the circuit interrupting position to the circuit completing position and, therefore, the motor Mo can be restarted with no fault.

It is also to be noted that the recovery time $T_1$ of the bimetallic element 54 can be adjusted by suitably selecting the thermal coupling between the thermistor 25 and the bimetallic element 54.

The combination starter-protector device according to the present invention operates in a similar manner even though any one of the respective circuits of FIGS. 9(*b*) to 9(*d*) is employed in association therewith.

In the combined starter-protector device of the construction shown in and described with reference to FIGS. 3 to 7, since the starter and protector units are mounted one above the other with their respective housings communicated to each other through the heat transmitting perforation, both the thermistor and the bimetallic elements are subjected to the same cooling condition whereby the recovery time of the overload relay can be made larger than the recovery time of the thermistor. Therefore, restart of the motor subsequent to the return of the bimetallic element from the circuit interrupting position to the circuit completing position can readily be performed with no fault and, in addition, since the device itself can be mounted directly to the motor housing, a simplified wiring system can be employed. Moreover, the device of the present invention can be used in association with any start circuit, such as CSIR, CSR or PSC start circuit, with no modification required and has, therefore, a relatively large range of application.

Figure 10:
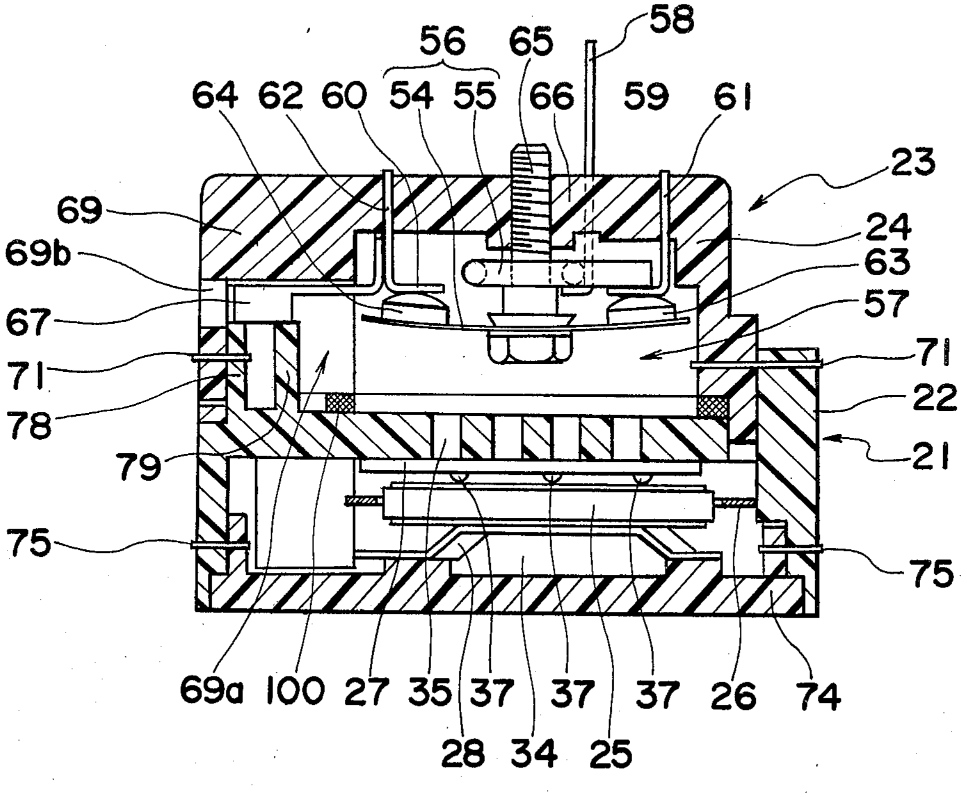
FIG. 10 is a longitudinal cross-sectional view of the combination starter-protector device according to a second preferred embodiment of the present invention.
Figure 12:
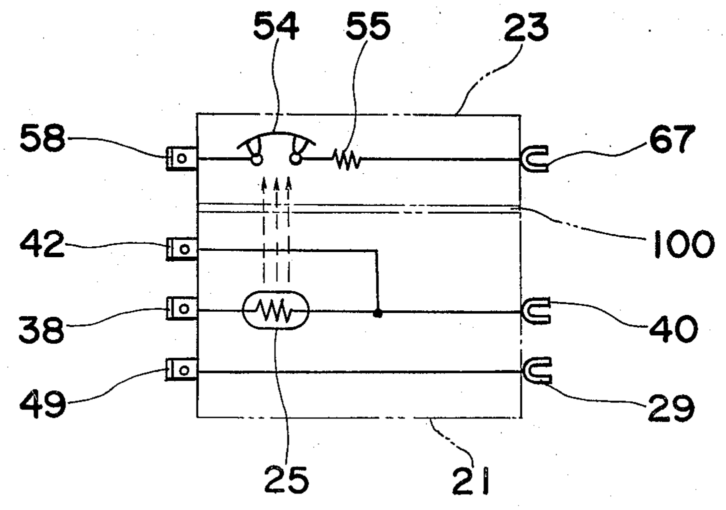
FIG. 12 is a diagram showing an electrical equivalent circuit of the device shown in FIG. 10.
Figure 11:
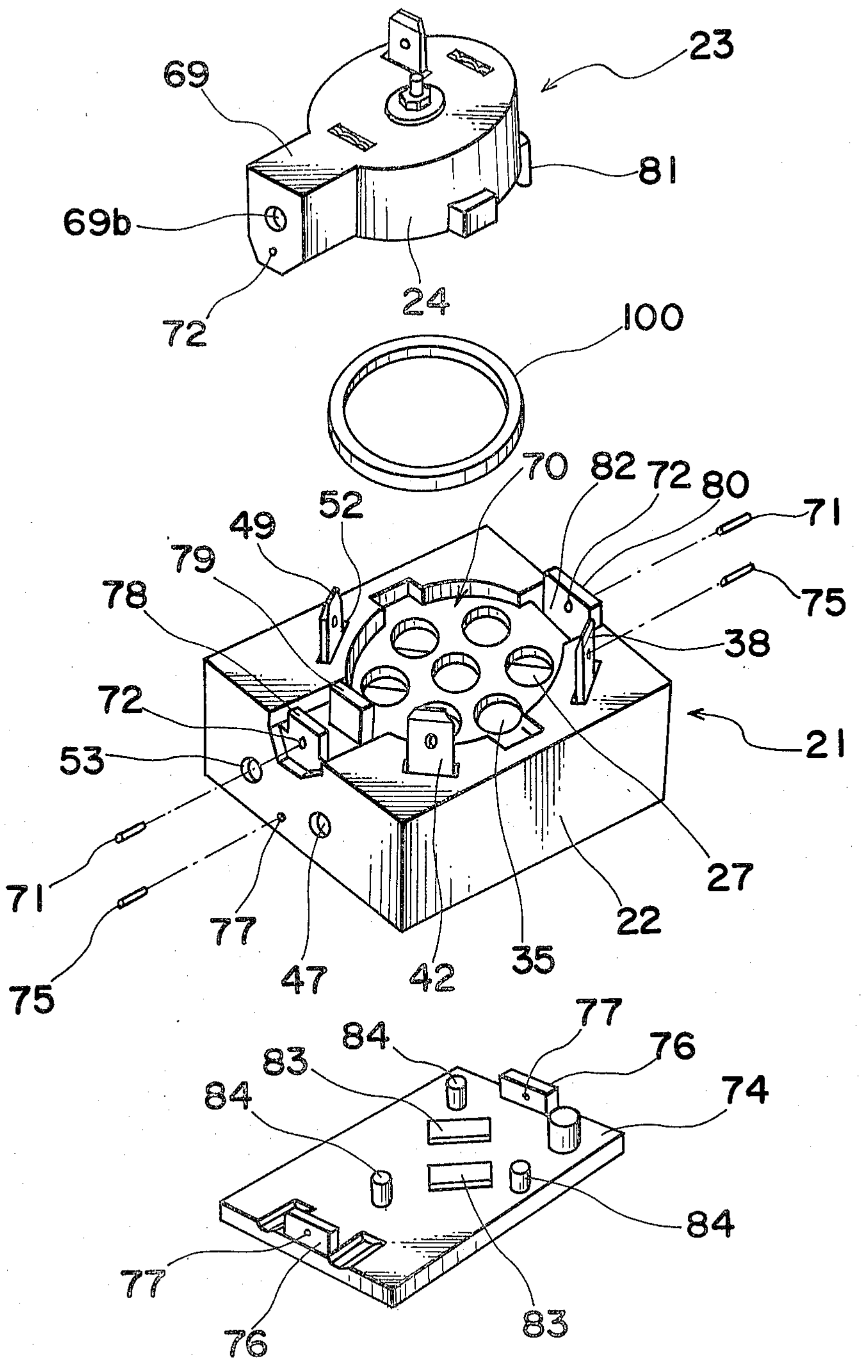
FIG. 11 is an exploded view of the device shown in FIG. 10.

The combination starter-protector device according to a second preferred embodiment of the present invention shown in FIGS. 10 to 12 differs from that according to the foregoing embodiment shown in FIGS. 3 to 7 in respect of the number of the perforations communicating between the thermistor and relay chambers 34 and 57 and the space or distance between the thermistor 25 and the bimetallic element 54.

As best shown in FIGS. 10 and 11, in the device according to the second preferred embodiment of the present invention, the number of the perforations 35 defined in the starter housing 22 is plural and, in addition, the protector housing 24 is mounted on the starter housing 22 with a spacer ring 100 interposed between these housings 22 and 24.

Specifically, the spacer ring 100 is preferably made of a heat-resistant synthetic resin or a metal and has an outer diameter sufficient to allow it to be received in the mounting recess 70, the inner diameter of which is sufficient to allow the inner periphery of the ring 100 to be positioned externally of the apertures 35. The spacer ring 100 so sized and so shaped is utilized to adjust the degree of the thermal coupling between the thermistor 25 and the bimetallic element 54 by keeping a predetermined distance between the starter and protector housings 22 and 24, which predetermined distance is determined by the thickness of the spacer ring 100.

Figure 13:
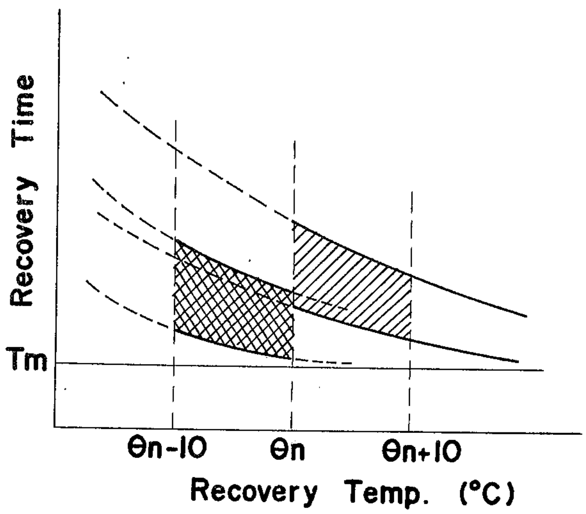
FIG. 13 is a graph showing the relationship between the recovery time of the PTC thermistor and the recovery time of the overload relay, both employed in the device of the present invention.

With respect to the selection of the thickness of the spacer ring 100, where the bimetallic element 54 has a recovery temperature approximating to the temperature $\theta n$-10° C., the spacer ring 100 should have a relatively large thickness to thereby reduce the degree of the thermal coupling between the thermistor 25 and the bimetallic element 54 in such a way as to result in the reduced recovery time of the overload relay as shown by the cross-hatched area in the graph of FIG. 13.

The capability of employment of the spacer ring 100 in the device according to the present invention is advantageous in that, even though one or both of the PTC thermistors and the bimetallic elements have varying recovery time characteristics, the combination starter-protector devices according to the present invention can be fabricated and assembled to the close tolerance merely by employing the spacer rings, one for each device, of a selected thickness. Therefore, the employment of the spacer ring 100 permits the employment of the bimetallic element having its recovery temperature largely diverting from the tolerance and also the employment of the bimetallic element having its recovery temperature within the relatively large range of tolerance. This in turn brings about the increased yield of the combination starter-protector devices being manufactured, thereby reducing the cost thereof.

It is to be noted that, instead of the employment of the spacer ring 100 shown in FIGS. 10 and 11, a plurality of spacer projections may be employed, in which case they should be rigidly mounted on, or formed integrally with the starter housing 22 so as to project upwardly from the bottom of the mounting recess 70 and so as to be arranged in a ring-shaped contour or any other suitable contour clear of the perforations 35.

FIG. 12 illustrates the combination starter-protector device according to the second preferred embodiment of the present invention depicted in a manner similar to that shown in FIG. 8.

Figure 4:
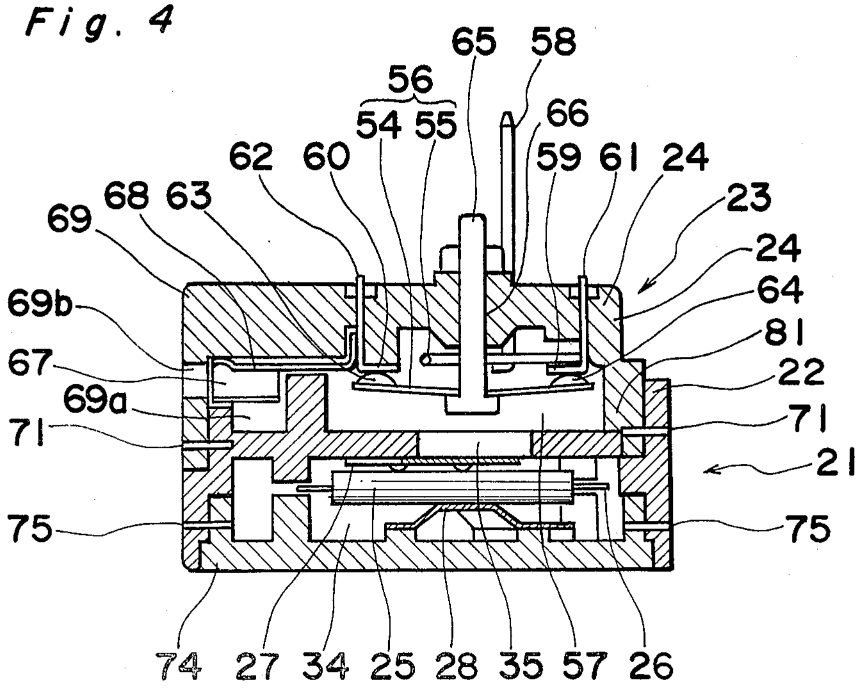
FIG. 4 is a longitudinal cross-sectional view of the device shown in FIG. 3.
Figure 15:
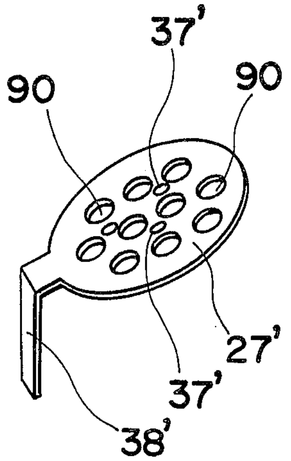
FIG. 15 is a perspective view of a terminal member used in the device of FIG. 14.
Figure 14:
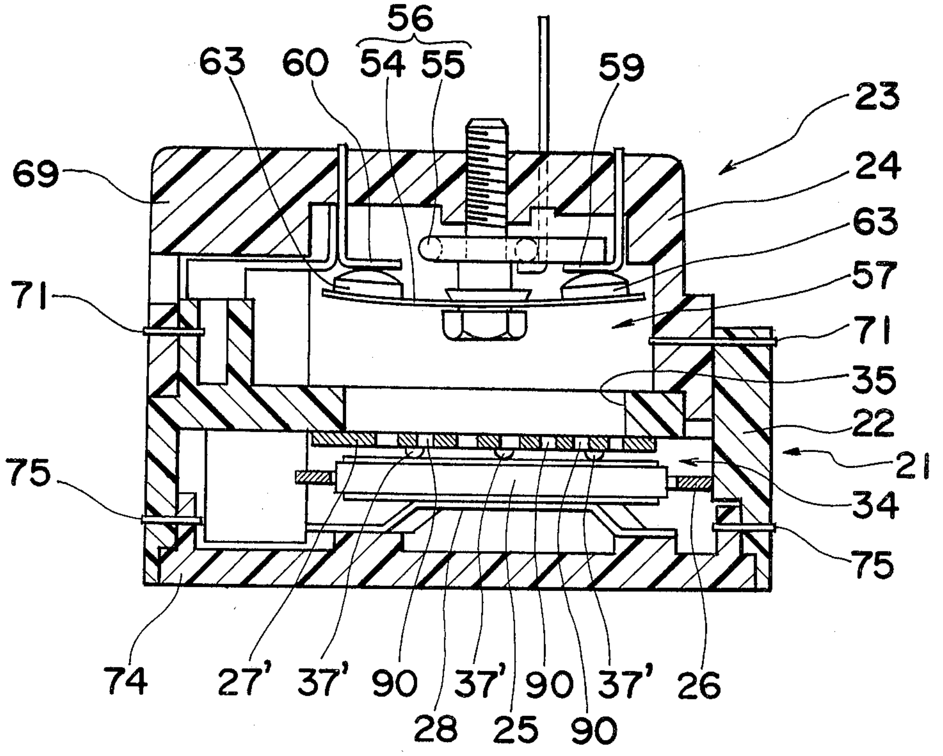
FIG. 14 is a longitudinal cross-sectional view of the combination starter-protector device according to a third preferred embodiment of the present invention.

Referring now to FIGS. 14 and 15, the aperture 35 shown therein has a diameter larger than that shown in FIGS. 4 and 5 on the one hand and the terminal member 27' is employed in place of the generally elongated strip-shaped terminal member 27 employed in the foregoing embodiments. The terminal member 27' has a perforated disc body of a diameter larger than the perforation 35 having formed thereon contacts 37' corresponding in function to the contacts 37 in the generally strip-shaped terminal member 27, and also has a tab-on terminal 38' corresponding in function to the tab-on terminal 38 and radially outwardly extending from the disc body thereof and bent at right angles to the plane of the disc body.

The starter chamber 34 and the relay chamber 57 in the device shown in FIGS. 14 and 15 are communicated to each other through a plurality of perforations 90 defined in the disc body of the terminal member 27'. The perforations 90 in the terminal member 27' may be of any suitable shape, for example, circular, rectangular, triangular or a combination thereof.

In particular, the arrangement wherein the thermistor chamber 34 and the relay chamber 57 are communicated to each other through the plural perforations such as the perforations 35 in the embodiment of FIGS. 10 or 12 or the perforations 90 in the terminal member 27' in the embodiment of FIGS. 14 and 15, is advantageous in that, in the event of the occurrence of the breakage or rupture of the thermistor 25, any possible scattering of fragments thereof into the relay chamber 57, which would result in the electrical shortcircuiting, can be substantially eliminated or minimized.

It is to be noted that, by suitably selecting the thickness of at least the disc body of the terminal member 27', the terminal member 27' can be concurrently utilized as a spacer operable to adjust the degree of thermal coupling between the thermistor 25 and the bimetallic element 54. In this case, the space ring 100 described as employed in the embodiment of FIGS. 10 and 11 may not be employed if so desired. It is also to be noted that the terminal member 27' may be embedded in position in the starter housing 22 during the manufacture of the starter housing 22 by the use of any known plastics molding technique, in which case the fabrication or assembly of the combination starter-protector device can advantageously be simplified.

Although the present invention has fully been described with reference to the accompanying drawings in connection with the preferred embodiments thereof, it is to be noted that various changes and modifications are apparent to those skilled in the art. By way of example, the shape and size of the tab-on terminals and/or the socket terminals may not be limited to that described and shown, but may be of any suitable or desired shape and size.

Accordingly, such changes and modifications are, unless they depart from the true scope of the present invention, to be construed as included therein.

We claim:

1. A combination starter-protector device for a winding circuit of a single phase induction motor adapted to be energized from an electrical power source, which device comprises:

a housing structure having separate starter and protector compartments separated by a perforated wall interposed therebetween, the housing structure including at least a first outer surface area facing in a first direction and a second outer surface area facing in a second direction, different than said first direction;

a PTC thermistor housed within the starter compartment and having a pair of opposite electrodes;

a bimetal switch housed within the protector compartment and including a bimetallic element and a pair of spaced contacts rigidly carried by the housing structure in face-to-face relationship with and operatively engaging the bimetallic element, said bimetallic element being capable of assuming a circuit interrupting position, in which said bimetal switch is opened, and a circuit completing position in which said bimetal switch is closed;

a first terminal means carried by the housing structure and having a pair of opposite ends, one of the ends of said first terminal means being formed by a tab-on terminal and being exposed to the outside of the housing structure and the other of said opposite ends being connected to one of the spaced contacts;

a second terminal means carried by the housing structure and having a pair of opposite ends, one of the ends of said second terminal means being formed by a socket and being exposed to the outside of the housing structure and the other of said opposite ends being connected to the other of the spaced contacts;

a third terminal means carried by the housing structure and having a pair of opposite ends, one of said opposite ends of said third teminal means being formed by a tab-on terminal and being exposed to the outside of the housing structure and the other of said opposite ends being connected to one of the opposite electrodes of the thermistor;

a fourth terminal means carried by the housing structure and having a pair of opposite ends, one of said opposite ends of said fourth terminal means being formed by a socket and being exposed to the outside of the housing structure and the other of said opposite ends being connected to said one of the opposite electrodes of the thermistor;

a fifth terminal means carried by the housing structure and having a pair of opposite ends, one of said opposite ends of said fifth terminal means being formed by a tab-on terminal and being exposed to the outside of the housing structure and the other of said opposite ends being connected to the other of the opposite electrodes of the thermistor; and a sixth terminal means having a pair of opposite ends exposed to the outside of the housing structure, one of said opposite ends of said sixth terminal means being formed by a tab-on terminal, another of said opposite ends of said sixth therminal means being formed by a socket, said sockets being oriented in a first direction extending through said first surface area of said housing structure, said tab-on terminals being oriented in a second direction extending through said second surface area of said housing structure.

2. A device as claimed in claim 1, wherein the housing structure is constituted by generally box-like first and second housings, the first housing having the starter compartment defined therein, said perforated wall occupying the bottom of the box-like first housing, said second housing having the protector compartment defined therein and mounted on the first housing with its opening facing the perforated wall in the first housing.

3. A device as claimed in claim 2, wherein the perforated wall has at least one perforation defined therein and communicating between the starter and protector compartments.

4. A device as claimed in claim 2, wherein the perforated wall has a plurality of perforations defined therein and communicating between the starter and protector compartments.

5. A device as claimed in claim 3, wherein said other of the opposite ends of said fifth terminal means is constituted by a disc body of a diameter larger than the diameter of said perforation in the perforated wall, said disc body having a plurality of apertures defined therein.

6. A device as claimed in claim 2, 3, 4 or 5, further comprising a spacer means interposed between the first and second housings.

7. A device as claimed in claim 1, further comprising a heating element connected in series between the other of the opposite ends of the second terminal means and the other of the spaced contacts.

8. A device as claimed in claim 6, further comprising a heating element connected in series between the other of the opposite ends of the first terminal means and the other of the spaced contacts.

9. A device as claimed in claim 1, wherein said first and second directions are substantially orthogonal.

* * * * *